United States Patent Office 3,830,801
Patented Aug. 20, 1974

3,830,801
ESTERIFICATION OF PENICILLIN ACIDS
Roy Bywood, Ulverston, and Gerard Gallagher, Barrow-in-Furness, England, Girijesh Kumar Sharma, Delhi, India, and Derek Walker, Westmorland, England, assignors to Glaxo Laboratories Limited, Greenford, Middlesex, England
No Drawing. Filed Jan. 11, 1972, Ser. No. 217,040
Claims priority, application Great Britain, Jan. 12, 1971, 1,528/71
Int. Cl. C07d 99/16, 99/24
U.S. Cl. 260—239.1                           13 Claims

ABSTRACT OF THE DISCLOSURE

The invention provides a method of esterifying N-blocked amino acids by reaction of the N-blocked acid with a hydrazone and an oxidising agent.

This invention is concerned with improvements in or relating to the preparation of esters of N-blocked amino acids.

There is a growing need for esterification processes which can be applied to such acids without disturbing their molecular geometry, i.e. without molecular disruption or molecular rearrangements such as isomerization and racemization. Such processes are particularly needed in the manufacture of cephalosporin and penicillin antibiotics where it is frequently necessary to protect a carboxyl group by esterification to enable chemical transformations to be carried out elsewhere in the molecule.

Esterification of penicillin and cephalosporin compounds is beset with difficulties owing to the facility with which a variety of undesired side reactions can occur. For example:

(1) The $\beta$-lactam ring may open easily under quite mild conditions. Also, in the presence of acids, undesired reaction can occur between the secondary amide group and the $\beta$-lactam ring, especially in the penicillins.

(2) Furthermore, in the presence of acids, the 4-carboxyl group in cephalosporins containing various functional groups at C–3, e.g. $CH_2OH$ or $CH_2OCOCH_3$, can easily undergo $\gamma$-lactone ring formation.

(3) Additionally, the carboxyl group of both penicillins and cephalosporins can enter into other reactions. For example, in ester forming reactions in the presence of base, the penicillins may rearrange to anhydro-penicillins and cephalosporins may give mixtures of 2-em and 3-em products.

It may be necessary to remove the carboxyl-protecting group from penicillins and cephalosporins after the desired chemical transformation has been accomplished. This leads to the further requirement that the carboxyl-protecting group should be of such a structure that it can be easily removed later in the process under mild conditions. Protecting groups of this character include diphenylmethyl and p-methoxybenzyl.

On account of these difficulties, the generally useful and cheap esterifying methods are of limited application in the esterification of N-blocked amino acids such as penicillins and cephalosporins for protective purposes.

We have now found that a variety of esters can conveniently be obtained under mild conditions by using as the esterifying agent a combination of a hydrazone of an aldehyde or ketone and an oxidizing agent. In this way a variety of commercially available aldehydes and ketones have been used to make corresponding esters. The process is particularly applicable to N-blocked amino acids containing a $\beta$-lactam structure, e.g. penicillin and cephalosporin acids, as well as to other N-blocked amino acids and N-blocked peptides.

According to the present invention there is provided a process for the preparation of an ester of an N-blocked amino acid which comprises contacting said N-blocked amino acid, preferably in less than about a molar proportion, with a hydrazone of the general formula

(wherein $R^2$ is hydrogen or an organic substituting group and $R^3$ is an organic substituting group or $R^2$ and $R^3$ together with the adjacent carbon atom form a cyclic organic substituting group) in the presence of an oxidising agent to yield a compound containing the ester group

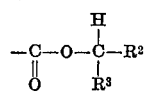

where $R^2$ and $R^3$ have the above defined meanings. Where $R^2$ and/or $R^3$ are organic substituting groups these advantageously contain 1–20 carbon atoms each, more preferably 4–10 carbon atoms. When $R^2$ and $R^3$ together with the adjacent carbon atoms form a cyclic group this may contain 5–20 carbon atoms.

The resulting esters may thus be depicted as having the formula

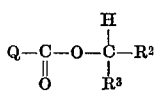

where $R^2$ and $R^3$ have the above-defined meanings and Q.COOH is the N-blocked amino acid which has been esterified. Q may be an organic group containing 1–50 carbon atoms. The acid may be a mono-, di- or polycarboxylic acid.

Novel esters which we have prepared by the process of the invention include:

2'-Methyldiphenylmethyl 2,2-dimethyl-6$\beta$-phenylacetamidopenam-3$\alpha$-carboxylate 1$\beta$-oxide;
3'-Methyldiphenylmethyl 2,2-dimethyl-6$\beta$-phenylacetamidopenan-3$\alpha$-carboxylate 1$\beta$-oxide;
4'-Methyldiphenylmethyl 2,2-dimethyl-6$\beta$-phenylacetamidopenam-3$\alpha$-carboxylate 1$\beta$-oxide;
4'-Chlorodiphenylmethyl 2,2-dimethyl-6$\beta$-phenylacetamidopenam-3$\alpha$-carboxylate 1$\beta$-oxide;
$\alpha$-(Thien-2-yl) benzyl 2,2-dimethyl-6$\beta$-phenylacetamidopenam-3$\alpha$-carboxylate 1$\beta$-oxide;
$\alpha$-Methylbenzyl 2,2-dimethyl-6$\beta$-phenylacetamidopenam-3$\alpha$-carboxylate 1$\beta$-oxide;
Fluoren-9-yl 2,2-dimethyl-6$\beta$-phenylacetamidopenam-3$\alpha$-carboxylate 1$\beta$-oxide;
Fur-2-yl methyl 2,2-dimethyl-6$\beta$-phenylacetamidopenam-3$\alpha$-carboxylate 1$\beta$-oxide;
Cyclohexyl 2,2-dimethyl-6$\beta$-phenylacetamidopenam-3$\alpha$-carboxylate 1$\beta$-oxide;
Diphenylmethyl 3-acetoxymethyl-7$\beta$-(2-thienylacetamido) ceph-3-em-4-carboxylate 1$\beta$-oxide;
Diphenylmethyl D(—)-N-(2,2,2-trichloroethoxycarbonyl)-2-phenylglycinate; and
Diphenylmethyl D(—)-phenylglycinate hydrochloride, and these constitute a further feature of the invention.

The process according to the invention is particularly applicable to the formation of esters of carboxyl groups in intermediate compounds encountered in the synthetic or semi-synthetic production of biologically active compounds. For example, in the manufacture of cephalosporin and penicillin antibiotics it is frequently necessary to protect a carboxyl group in a carboxyl group-containing ring system by esterification to enable chemical transformation to be carried out elsewhere in the molecule. An important example of this lies in the ring expansion process of manufacturing cephalosporin antibiotics from penicillin compounds, as disclosed, for example, in U.S. Pat. No. 3,275,626.

The invention will be further described with particular reference to β-lactam compounds, more particularly penicillins and cephalosporins, but it will be understood that it is not limited thereto.

The penicillin and cephalosporin compounds referred to in this specification are generally named with reference to cepham (J. Amer. Chem. Soc. 1962, 84, 3400) and penam (J. Amer. Chem. Soc., 1953, 75, 3293). The term "cephem" refers to the basic cepham structure with one double bond.

The penicillin or cephalosporin compound to be esterified may be a compound of the skeletal formula

wherein Z is $>$S or $>$S→O (α- or β-); X is a divalent group selected from

and

(where Y is methyl; substituted methyl e.g. —CH$_2$Y' where Y' is the residue of a nucleophile such as acetoxy or hydroxy; or an unsaturated group such as vinyl and the dotted line between the 2-, 3- and 4-positions of (b) indicates that the compound may be a ceph-2-em or ceph-3-em compound) and R$^1$ is a blocked amino group e.g. a carboxylic acylamido group (e.g. containing 1–20 carbon atoms) or a protonated amino group (NH$_3^+$). The invention finds particular application where Z is $>$S→O.

Where R$^1$ is a carboxylic acylamido group this may be chosen from the extensive lists of such acyl groups in the penicillin and cephalosporin literature. Specific acyl groups are illustrated in the accompanying list which is not intended to be exhaustive:

(i) R$^u$C$_n$H$_{2n}$CO— were R$^u$ is aryl (carbocyclic or heterocyclic), cycloalkyl, substituted aryl, substituted cycloalkyl, cyclohexadienyl, or a non-aromatic heterocyclic or mesoinic group and $n$ is 0 or an integer from 1–4. Examples of this group include phenylacetyl; thien-2- and -3-ylacetyl; 4-isoxazolyl and 4-isoxazolylacetyl both substituted or unsubstituted; pyridylacetyl, tetrazolylacetyl or a sydnoneacetyl group.

(ii) C$_n$H$_{2n+1}$CO— where $n$ is 0 or an integer from 1–7. Any alkyl group may be straight or branched and may be substituted by e.g. a cyano group, a carboxy group, an alkoxy-carbonyl group, a hydroxy group, an amino group or a carboxyl-carbonyl group (—CO.COOH) or any such group in which the functional group is blocked. Examples of such groups include formyl, glutaroyl, δ-aminoadipoyl and N-benzoyl-δ-aminoadipoyl.

(iii)

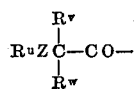

where R$^u$ has the meaning defined under (i) and in addition may be benzyl, and R$^v$ and R$^w$ which may be the same or different each represent hydrogen, phenyl, benzyl, phenethyl or lower alkyl and Z is an oxygen or sulphur atom. Examples of this group include phenoxyacetyl or pyridylthioacetyl.

(iv) Hydrocarbyloxycarbonyl and substituted hydrocarbyloxy groups (wherein the 6- or 7-amino group forms part of a urethane) in particular lower alkoxycarbonyl groups (such as methoxycarbonyl, ethoxycarbonyl and, most preferably, t-butoxycarbonyl groups); halo lower alkoxycarbonyl groups e.g. 2,2,2-trichloroethoxycarbonyl; aralkoxycarbonyl groups such as benzyloxycarbonyl, 4 - methoxybenzyloxycarbonyl, diphenylmethoxycarbonyl and 4-nitrobenzyloxycarbonyl groups. Cycloalkyloxycarbonyl groups are also advantageous, especially the adamantyloxycarbonyl group.

(v) R$^u$.CH(X).CO— where R$^u$ has the meaning defined under (i) and X is amino, substituted amino (e.g. acylamido or a group obtained by reacting the α-aminoacylamido group of the 6- or 7-side chain with an aldehyde or ketone e.g. acetone, methylethylketone or ethyl acetoacetate), hydroxy, carboxy, esterified carboxy, azido, triazolyl tetrazolyl, cyano, halogeno, acyloxy (e.g. formyloxy or lower alkanoyloxy) or etherified hydroxy group. Examples of such acyl groups are α-aminophenylacetyl, and α-carboxyphenylacetyl. It will be appreciated that, when X is amino, this group must be blocked before an acid containing this particular acyl group can be used in our process.

It will be appreciated that skeletal formula II includes within its structure compounds not specifically embraced by groups (a) and (b), e.g. 2β-acetoxymethylpenicillins and 2-methyl and 2-methylene cephalosporins.

Compounds of formula (IIb) wherein Y' is the residue of a nucleophile may be prepared by reacting the compound of formula (IIb) where Y'=acetoxy with a nucleophile, for example pyridine or other tertiary amine as described in British Pat. No. 912,541;; a sulphur-linking, nitrogen-linking or inorganic nucleophile as described in British Pat. No. 1,012,943; a sulphur-linking nucleophile as described in British Pat. No. 1,059,562; a nitrogen-linking nucleophile as described in British Pats. Nos. 1,030,630, 1,082,943 and 1,082,962; or a sulphur-linking nucleophile as described in British Pats. Nos. 1,101,423 and 1,206,305. This list is not limiting and is given purely by way of illustraton. Where Y is a hydroxy group the compound may be prepared by the methods described in British Pat. No. 1,121,308; where Y is a hydrogen atom the compound may be prepared by the method described in British Pat. No. 957,569.

The hydrazone of general formula (I) used in the process according to the invention may be obtained by any convenient method e.g. by reacting a carbonyl compound of the formula R$^2$R$^3$CO where R$^2$ and R$^3$ have the above-defined meanings with hydrazine.

When R$^2$ and/or R$^3$ are organic substituting groups they may be the same or different and may be selected from alkyl groups preferably containing 1–6 carbon atoms, such as methyl, ethyl-$n$-propyl etc.; cycloalkyl groups which may contain 5–7 carbon atoms in the ring, e.g. cyclohexyl; aryl groups such as phenyl, naphthyl etc.; aralkyl groups, which are preferably monocyclic and contain 1–6 carbon atoms in the alkyl portion, such as benzyl; 5- or 6-membered heterocyclic rings containing one or more of O, N and S, e.g. thienyl or furyl; or any of the above groups substituted by one or more halogen atoms, cyano, nitro, alkyl or alkoxy groups, these last preferably containing 1–6 carbon atoms, such as methyl, ethyl, $n$-propyl, ethoxy, iso-propoxy etc. When R$^2$ and R$^3$ together with the adjacent carbon atom form a cyclic group, this may be C$_5$ or C$_6$ cycloalkyl. The hydrazones of formula I thus include hydrazones of aromatic aldehydes and ketones, e.g. benzophenone, acetophenone, propiophenone, $p$-methoxybenzaldehyde or $o$- or $p$-methylbenzophenone; hydrazones of cyclic ketones such as cycoalkyl ketones containing 5–7 carbon atoms or fluorenone; and hydrazones of heterocyclic-containing systems such as phenyl thien-2-yl ketone or furfural.

Suitable oxidizing agents for use in the process according to the invention include organic peracids, e.g. peracetic acid or m-chloroperbenzoic acid; a system in which peracids are produced *in situ*, e.g. from organic acids and $H_2O_2$; organic peresters; chromium trioxide; *t*-butylhypochlorite; Fremys salt; chloric, bromic or iodic acid; periodic acid; chlorine; bromine; permanganic acid; chromic acid; ozone; dinitrogen tetroxide; oxygen (including atmospheric oxygen); lead tetraacetate; manganese dioxide; silver oxide and ceric salts. Peracetic acid is preferred. The oxidizing agent is preferably chosen so that it does not oxidise any group other than the hydrazone group although in the case of the penicillins and cephalosporins there may be advantage associated with the choice of an oxidising agent which, in addition to oxidising the hydrazone group oxidises the sulphur atom at the 1-position.

The process according to the invention may be facilitated by the addition of a catalyst. Suitable catalysts include iodine, a cupric salt such as cupric acetate, a cobalt salt such as cobalt naphthenate, ferrous salts or dibenzoyl peroxide.

The esterification is desirably effected in an organic solvent. The organic solvent is desirably but not necessarily inert. Organic solvents which may be used include chlorinated hydrocarbons, e.g. methylene dichloride, chloroform, 1,1-dichloroethane and 1,2-dichloroethane; ethers and cyclic ethers, e.g. diethylether, dioxan and tetrahydrofuran; aromatic hydrocarbons, e.g. benzene and toluene; aliphatic esters e.g. ethyl acetate and butyl acetate; ketones e.g. acetone; amides e.g. dimethylformamide and dimethylacetamide; aliphatic nitriles, e.g. acetonitrile; alcohols e.g. methanol and butanol and sulphoxides e.g. dimethylsulphoxide. Alternatively, the reaction may be effected in an aqueous reaction medium. The material to be esterified should be at least partly soluble in the chosen solvent. Amino acids which are N-blocked by protonation generally exhibit low solubility in organic solvents, and aqueous solvent media such as aqueous alcohols, e.g. aqueous methanol or aqueous butanol may be required for esterification. Chlorinated hydrocarbons are preferred solvents in the case of N-blocked amino acids wherein the blocking group is an acid or alkoxycarbonyl group.

The reaction is exothermic and may be effected at a temperature in the range $-50°$ to $+120°$ preferably $-10°$ to $+40°$.

The course of the reaction may be followed by measuring the evolution of nitrogen. The rate of evolution of nitrogen falls as the reaction moves toward completion and since the reaction is exothermic the evolution of heat also diminishes toward the end of the reaction.

Conveniently there is added to the hydrazone as a solution in an organic solvent of the type outlined above, a mixture of the acid to be esterified, the oxidizing agent and, if present, the catalyst also in an organic solvent. Alternatively, in the case of benzophenone and substituted benzophenone hydrazones the oxidising agent may be added to a solution or suspension of the other reactants. Again, in the case of furfuraldehyde hydrazone it is preferred to add the hydrazone to a mixture of the other reagents. The rate of addition and the thermal control are preferably such as to maintain the temperature of the reaction mixture in the range $-50°$ to $+120°$ C. However, other modes of addition may also be employed. In the case of organic peracid oxidants, lower yields of desired ester result if the oxidising agent and the hydrazone are mixed prior to adding the acid to be esterified. Where the various components are brought together in organic solvents it is preferable that the solvents should be the same.

The process may conveniently be carried out using 1–3, e.g. 1–2, moles of oxidising agent, 1–3, e.g. 1–2, moles of hydrazone and $10^{-1}$ to $10^{-3}$ moles of catalyst per mole of the acid to be esterified. Generally the preferred range is 1.1 to 1.4 moles each of oxidizing agent and hydrazone per mole of acid to be esterified. The reaction may also be carried out by adding part of the oxidizing agent followed by part of the hydrazone or by adding these reagents to the acid simultaneously and equivalently.

While we do not wish to be bound by theoretical considerations, it appears to us to be likely that the esterification proceeds in one of two possible ways. A carbonium ion, $R^2R^{3+}CH$, may be generated which then reacts with the conjugate base of the acid that it is desired to esterify or alternatively the esterification may proceed through an intermediate in which the carbon atom of the hydrazone (I) is still linked to the nitrogen atom but is also linked to an oxygen atom of the carboxyl group to be esterified. Such an intermediate would rapidly give way to the desired ester.

In order that the invention may be well understood the following examples are given by way of illustration only. All temperatures are in $°$ C.

EXAMPLE 1

To 2,2-dimethyl-6$\beta$-phenylacetamidopenam-3$\alpha$-carboxylic acid 1$\beta$-oxide (3.5 g.; 10 mmoles) in dichloromethane (80 ml.) was added peracetic acid (2.05 ml. of a 38.5% w./w. solution in acetic acid; 11.8 mmoles) and iodine (0.2 ml. of a 1% w./v. solution in dichloromethane). The mixture was stirred at ambient temperature and benzophenone hydrazone (2.2 g.; 11 mmoles) in dichloromethane (20 ml.) was added during 15 minutes. The mixture was stirred for a further 35 minutes after the addition had been completed and was then washed with an aqueous solution of sodium bicarbonate (30 ml. of 2.5% w./v.) and water (30 ml.) and dried over anhydrous magnesium sulphate. After filtration the solution was evaporated under reduced pressure and the residue crystallised from n-butanol (5 ml.), filtered, washed with n-butanol (3 ml.) and ether (5 ml.) and dried *in vacuo* at 40° to yield 4.49 g. (86.8%) of diphenylmethyl 2,2-dimethyl 6$\beta$-phenylacetamidopenam-3$\alpha$-carboxylate 1$\beta$-oxide melting at 126–127°.

EXAMPLE 2

To 2,2-dimethyl-6$\beta$-phenylacetamidopenam-3$\alpha$-carboxylic acid 1$\beta$-oxide (17.5 g.; 50 mmoles) in dichloromethane (150 ml.) was added peracetic acid (10 ml. of a 39.5% w./w. solution in acetic acid; 59 mmoles) and iodine (1 ml. of a 1% solution in dichloromethane) and the mixture stirred and cooled to $-12°$. A solution of benzophenone hydrazone (11 g.; 55 mmoles) in dichloromethane (40 ml.) was added abruptly and the mixture stirred for 30 minutes before washing with aqueous sodium bicarbonate solution (200 ml.; 7.3% w./v.) and water (200 ml.). After drying over anhydrous magnesium sulphate the solution was evaporated under reduced pressure and the residue crystallised from n-butanol (25 ml.) to give 21.38 g. (83.0%) analytically pure diphenylmethyl 2,2 - dimethyl-6$\beta$-phenylacetamidopenam-3$\alpha$-carboxylate 1$\beta$-oxide, m.p. 129–130°, $[\alpha]_D^{22}$ $+197.9°$ (*c* 0.9; chloroform).

Acidification of the sodium bicarbonate wash solution yielded 0.78 g. unchanged 2,2-dimethyl-6$\beta$-phenylacetamidopenam-3$\alpha$-carboxylic acid 1$\beta$-oxide.

EXAMPLE 3

2,2-Dimethyl - 6$\beta$ - phenylacetamidopenam-3$\alpha$-carboxylic acid 1$\beta$-oxide (3.5 g.; 10 mmoles) was suspended in ethyl acetate (80 ml.) and the mixture stirred during the addition of peracetic acid (2 ml. of a 38.9% w./w. solution in acetic acid; 11.6 mmoles). A solution of benzophenone hydrazone (2.2 g.; 11 mmoles) in ethyl acetate (20 ml.) was added slowly with stirring during 35 minutes and the mixture stirred thereafter for one hour. After storing the solution overnight it was washed with aqueous sodium bicarbonate solution (30 ml. of 2.5% w./v.) and water (30 ml.), dried over anhydrous magnesium sulphate, filtered, evaporated under reduced pressure and the residue crystallised from n-butanol (5 ml.) to give 3.88 g. (75.2%) diphenylmethyl 2,2-dimethyl-6β-phenyl-acetamidopenam-3α-carboxylate 1β-oxide which melted at 125–127° and of which the ultra-violet spectrum indicated a purity of 99.4%. Thin-layer chromatography on silica plates (2:1 v./v. benzene:ethyl acetate) revealed benzophenonazine as the sole impurity.

EXAMPLE 4

2,2 - Dimethyl - 6β - phenylacetamidopenam-3α-carboxylic acid 1β-oxide (3.5 g.; 10 mmoles) was dissolved in tetrahydrofuran (80 ml.) and peracetic acid (2.05 g. of a 37.9% w./w. solution in acetic acid; 11 mmoles) added. The mixture was stirred at ambient temperature and a solution of acetophenone hydrazone (1.48 g.; 11 mmoles) in tetrahydrofuran (20 ml.) was added during 11 minutes. The mixture was stirred for a further 75 minutes, stored overnight, evaporated under reduced pressue to an oil, the oil dissolved in ethyl acetate (100 ml.) and the solution so obtained was washed with water (30 ml.) with aqueous sodium bicarbonate (2× 30 ml. of 2.5% w./v.) and again with water (30 ml.). After drying the solution over anhydrous sodium sulphate, it was evaporated under reduced pressure and the residue degassed at 30° C. under reduced pressure. In this way α - methylbenzyl 2,2 - dimethyl - 6β - phenylacetamidopenam - 3α-carboxylate 1β - oxide was obtained (3.7 g., 78.7%) as a pale, yellow oil. The ester was obtained as a white crystalline solid from methanol; m.p. 174–5° and $[\alpha]_D^{22}$ +227.2° (c 0.9; chloroform).

EXAMPLE 5

A solution of 2,2 - dimethyl - 6β - phenylacetamidopenam - 3α - carboxylic acid 1β-oxide (3.5 g.; 10 mmole) and benzophenone hydrazone (2.2 g.; 11 mmole) in dichloromethane (80 ml.) was added abruptly to a stirred solution of peracetic acid (2.0 ml. of a 39.5% w./w. solution in acetic acid; 11.8 mmole) and iodine (0.2 ml. of a 1% w./v. solution in dichloromethane; 0.008 mmole) in dichloromethane (20 ml.). The temperature of the mixture was allowed to rise spontaneously. After stirring for 30 minutes the reaction mixture was washed with aqueous sodium bicarbonate solution (30 ml., 2.5% w./v.) and water (30 ml.), dried over magnesium sulphate, filtered, evaporated under reduced pressure, the residual gum crystallised from n-butanol (5 ml.), the crystalline solid filtered, washed with n-butanol (3 ml.) and diethyl ether (3 ml.) and dried *in vacuo* at 40° to give 3.9 g. (75.6%) diphenylmethyl 2,2 - dimethyl - 6β - phenylacetamidopenam - 3α - carboxylate 1β-oxide as a white solid, m.p. 126–7° C.

EXAMPLE 6

To a stirred solution of 2,2 - dimethyl - 6β - phenylacetamidopenam - 3α - carboxylic acid 1β - oxide (3.5 g.; 10 mmole) and benzophenone hydrazone (2.2 g.; 11 mmole) in dichloromethane (80 ml.) was added abruptly a solution of peracetic acid (2.0 ml. of a 39.5% w./w. solution in acetic acid; 11.8 mmole) and iodine (0.2 ml. of a 1% w./v. solution in dichloromethane; 0.008 mmole) in dichloromethane (20 ml.). The temperature of the reaction mixture was allowed to rise spontaneousyl. After stirring for 30 minutes the reaction mixture was washed with aqueous sodium bicarbonate solution (30 ml., 2.5% w./v.) and water (30 ml.), dried over magnesium sulphate, filtered, evaporated under reduced pressure, the residual gum crystallised from n-butanol (5 ml.), the crystalline solid filtered, washed with n-butanol (3 ml.) and diethyl ether (3 ml.) and dried *in vacuo* to give 4.45 g. (86.2%) diphenylmethyl 2,2-dimethyl-6β-phenylacetamidopenam-3α-carboxylate 1β-oxide, m.p. 127–8° C.

EXAMPLE 7

To a stirred solution of benzophenone hydrazone (2.2 g.; 11 mmole) and iodine (0.2 ml. of a 1% w./v. solution in dichloromethane; 0.008 mmole) in dichloromethane (20 ml.) was added abruptly a solution of 2,2-dimethyl-6β - phenylacetamidopenam - 3α-carboxylic acid 1β-oxide (3.5 g.; 10 mmole) and peracetic acid (2.0 ml. of a 39.5% w./w. solution in acetic acid; 11.8 mmole) in dichloromethane (80 ml.). The temperature of the reaction mixture was allowed to rise spontaneously. After stirring for 30 minutes the mixture was washed with aqueous sodium bicarbonate (30 ml., 2.5% w./v.) and water (30 ml.), dried over magnesium sulphate, filtered, evaporated under reduced pressure, the residue crystallised from n-butanol (5 ml.), the crystalline solid filtered, wash with n-butanol (3 ml.) and diethyl ether (3 ml.) and dried in vacuo to give 3.91 g. (75.8%) diphenylmethyl 2,2-dimethyl-6β-phenylacetamidopenam - 3α - carboxylate 1β-oxide, m.p. 126–7°.

EXAMPLE 8

A solution of peracetic acid (2.0 ml. of a 39.5% w./w. solution in acetic acid; 11.8 mmole), 2,2-dimethyl-6β-phenylacetamidopenam - 3α - carboxylic acid 1β-oxide (3.5 g.; 10 mmole) and iodine (0.2 ml. of a 1% w./v. solution in dichloromethane; 0.008 mmole) in dichloromethane (80 ml.) was added abruptly to a stirred solution of benzophenone hydrazone (2.2 g.; 11 mmole) in dichloromethane (20 ml.). The mixture was stirred for 30 minutes, washed with aqueous sodium bicarbonate (30 ml., 2.5% w./v.) and water (30 ml.), dried over magnesium sulphate, filtered and evaporated under reduced pressure. Crystallisation of the residue from n-butanol gave 4.4 g. (85.3%) diphenylmethyl 2,2 - dimethyl - 6β-phenylacetamidopenam - 3α - carboxylate 1β-oxide, m.p. 127–8°.

EXAMPLE 9

Benzophenone hydrazone (2. g.; 11 mmole), 2,2-dimethyl - 6β - phenylacetamidopenam-3α-carboxylic acid 1β-oxide (3.5 g.; 10 mmole) and iodine (0.2 ml. of a 1% w./v. solution in dichloromethane; 0.008 mmole) were dissolved in dichloromethane (100 ml.) and, with stirring, peracetic acid (2.0 ml. of a 39.5% w./w. solution in acetic acid; 11.8 mmole) was added abruptly. The temperature of the mixture was allowed to rise spontaneously. The mixture was stirred for 30 minutes, washed with aqueous sodium bicarbonate (30 ml., 2.5% w./v.) and water (30 ml.), dried over magnesium sulphate, filtered and evaporated under reduced pressure. Crystallisation of the residue from n-butanol gave 4.35 g. (84.3%) diphenylmethyl 2,2-dimethyl-6β-phenylacetamidopenam-3α-carboxylate 1β-oxide, m.p. 122–3° C.

EXAMPLE 10

To 2,2 - dimethyl - 6β - phenylacetamidopenam - 3α-carboxylic acid 1β-oxide (3.5 g.; 10 mmole) in chloroform (80 ml.) was added peracetic acid (2.0 ml. of a 39.5% w./w. solution in acetic acid; 11.8 mmole) and iodine (1 ml. of a 1% w./v. solution in dichloromethane; 0.04 mmole). The mixture was stirred and to it was added abruptly a solution of benzophenone hydrazone (2.2 g.; 11 mmole) in chloroform (20 ml.). The temperature of the mixture rose rapidly to 40° C. and then slowly fell. After storing overnight the solution was washed with aqueous sodium bicarbonate (30 ml.; 2.5% w./v.) and water (30 ml.), dried over anhydrous magnesium sulphate, filtered and evaporated under reduced pressure. Crystallisation of the residue from n-butanol gave 4.1 g. (79.3%) diphenylmethyl 2,2-dimethyl-6β - phenylacetamidopenam - 3α - carboxylate 1β - oxide, m.p. 128–9° C.

EXAMPLE 11

2,2 - Dimethyl - 6β - phenylacetamidopenam - 3α-carboxylic acid 1β-oxide (17.5 g. of a solvate containing 1.85% ethanol; 49.1 mmole) in chloroform (90 ml.) was stirred with peracetic acid (10.7 ml. of a 36.5% w./w. solution in acetic acid; 59 mmole) and iodine (2 ml. of a 1% w./v. solution in dichloromethane; 0.08 mmole) and the mixture transferred during 15 minutes to a stirred solution of benzophenone hydazone (11 g.; 55 mmole) in chloroform (40 ml.) maintaining the temperature about 10° C. After a line wash of chloroform (20 ml.) the reaction mixture was stirred 30 minutes at 10° C. and worked up in the usual manner to give 21.4 g. (84.4%) diphenylmethyl 2,2 - dimethyl - 6β - phenylacetamidopenam-3α-carboxylate 1β-oxide, m.p. 126–7°.

EXAMPLE 12

A solution prepared from 2,2 - dimethyl - 6β - phenylacetamidopenam - 3α - carboxylic acid 1β - oxide (17.5 g.; 50 mmole), benzophenone hydrazone (14 g.; 70 mmole) and iodine (2.6 ml. of a 1% w./v. solution in dichloromethane; 0.104 mmole) in chloroform (130 ml.) was stirred as peracetic acid (13.5 ml. of a 37.7% w./w. solution in acetic acid; 75.5 mmole) was added during 15 minutes with the temperature of the mixture maintained in the range 2.5 to 6° C. After stirring for 30 minutes at 6° C. the solution was washed with water (2× 200 ml.), aqueous sodium bicarbonate solution (150 ml.; 2.5% w./v.) and again with water (150 ml.). The aqueous liquors were reextracted sequentially with chloroform (50 ml.), the chloroform layers bulked, filtered through non-bibulous paper (Whatman 1 P/S) and evaporated under reduced pressure. Crystallisation of the residue from n-butanol gave 23.9 g. (92.3%) diphenylmethyl 2,2 - dimethyl - 6β - phenylacetamidopenam - 3α-carboxylate 1β-oxide, m.p. 125–6°.

EXAMPLE 13

A solution prepared from 2,2-dimethyl-6β-phenylacetamidopenam-3α-carboxylic acid 1β-oxide (35 g.; 100 mmole), benzophenone hydrazone (26 g.; 130 mmole) and iodine (4.8 ml. of a 1% w./v. solution in dichloromethane; 0.192 mmole) in chloroform (280 ml.) was stirred as peracetic acid (25 ml. of a 37.7% w./w. solution in acetic acid; 140 mmole) was added during 15 minutes keeping the temperature of the reaction mixture in the range 3 to 6.5° C. After stirring for 30 minutes at 5° C. the solution was washed with water (2× 400 ml.), aqueous sodium bicarbonate solution (300 ml., 2.5% w./v.) and again with water (300 ml.) the aqueous liquors being reextracted sequentially with chloroform (100 ml.). The chloroform liquors were bulked and a fourth part thereof was evaporated under reduced pressure to a foam. The foam was crystallised from 80% v./v. aqueous ethanol (50 ml.), the crystalline solid filtered, washed with 75% v./v. aqueous ethanol (25 ml.) and dried in vacuo at 40° to yield 12.9 g. (99.5%) diphenylmethyl 2,2 - dimethyl - 6β - phenylacetamidopenam - 3α-carboxylate 1β-oxide, m.p. 121–3°.

EXAMPLE 14

To a stirred solution of 2,2-dimethyl-6β-phenylacetamidopenam-3α-carboxylic acid 1β-oxide (17.5 g. of a solvate containing 8.4% w./w. methanol; 45.8 mmoles), benzophenone hydrazone (11 g.; 55 mmole) and iodine (2.0 ml. of a 1% w./v. solution in dichloromethane; 0.08 mmole) in 1,2 - dichloroethane (130 ml.), peracetic acid (10.5 ml. of a 37.7% w./w. solution in acetic acid; 59 mmole) was added during 15 minutes, keeping the temperature of the reaction mixture in the range 2.5–5.5° C. The mixture was stirred for 30 minutes at 5° C., washed with water (2× 200 ml.), aqueous sodium bicarbonate (150 ml., 2.5% w./v.) and again with water (150 ml.). The solution was dried, evaporated under reduced pressure and the residue was recrystallised from n-butanol (25 ml.) to give 22.9 g. (96.7%) diphenylmethyl 2,2 - dimethyl - 6β - phenylacetamidopenam - 3α-carboxylate 1β-oxide, m.p. 123–4°.

EXAMPLE 15

2,2 - Dimethyl - 6β - phenylacetamidopenam-3α-carboxylic acid 1β-oxide (3.5 g.; 10 mmole) was dissolved in dimethylformamide (80 ml.) and the solution stirred during the addition of peracetic acid (2.4 g. of a 35% w./w. solution in acetic acid; 11 mmole). A solution of benzophenone hydrazone (2.2 g.; 11 mmole) in dimethylformamide (20 ml.) was added slowly with stirring during 11 minutes and the mixture stirred for 25 minutes thereafter. The solution was evaporated under reduced pressure to remove part of the solvent dimethylformamide and the still-residue was diluted with water (200 ml.) to precipitate a yellow gum. The aqueous supernatant was decanted, the gum dissolved in chloroform, the chloroform solution washed with water, dried and evaporated to yield impure diphenylmethyl 2,2-dimethyl-6β-phenylacetamidopenam-3α-carboxylate 1β-oxide as a yellow oil. Yield 3.45 g.

EXAMPLE 16

2,2 - Dimethyl - 6β - phenylacetamidopenam - 3α - carboxylic acid 1β-oxide (3.5 g.; 10 mmole) was dissolved in acetone (80 ml.) and the solution stirred during the addition of peracetic acid (2.0 ml. of a 38.9% w./w. solution in acetic acid; 11.6 mmole). A solution of benzophenone hydrazone (2.2 g.; 11 mmole) was added with stirring during 35 minutes and the mixture stirred for one hour thereafter. The resulting solution was evaporated under reduced pressure and the residue dissolved in ethyl acetate (100 ml.) to be washed and worked up in the usual manner. Thus there was obtained 3.73 g. (72.2%) diphenylmethyl 2,2 - dimethyl - 6β - phenylacetamidopenam - 3α - carboxylate 1β - oxide which, assayed by ultra violet spectroscopy, proved to be of 97.5% purity.

EXAMPLE 17

2,2 - Dimethyl - 6β - phenylacetamidopenam - 3α - carboxylic acid 1β-oxide (3.5 g.; 10 mmole) was stirred with acetonitrile (100 ml.), peracetic acid (2.0 ml. of a 39.5% w./w. solution in acetic acid; 11.8 mmole) and iodine (1 ml. of a 1% w./v. solution in dichloromethane; 0.04 mmole), and to the mixture was added abruptly benzophenone hydrazone (2.2 g.; 11 mmole). The temperature was allowed to rise spontaneously as the hydrazone dissolved and a vigorous evolution of gas ensued. After stirring for one hour the mixture was stored overnight. The resulting solution was evaporated under reduced pressure and the residue dissolved in ethyl acetate (100 ml.) to be washed and worked up in the usual manner. There was thus obtained 3.57 g. (69.2%) diphenylmethyl 2,2 - dimethyl - 6β - phenylacetamidopenam - 3α - carboxylate 1β-oxide, m.p. 123.5–126° C.

EXAMPLE 18

2,2 - Dimethyl - 6β - phenylacetamidopenam - 3α - carboxylic acid 1β - oxide (100 mmol), benzophenone hydrazone (27 g.; 138 mmol), and iodine (5.0 ml. of a 1% w./v. solution in chloroform; 0.197 mmol) in 1,2 - dichloroethane (90 ml.) were stirred and cooled to −5°. Peracetic acid (25 ml. of a 38% w./w. solution in acetic acid; 140 mmol) was added slowly during 75 minutes keeping the temperature between −4° and −8°; followed by a line wash of 1,2-dichloroethane (10 ml.). The reaction mixture was stirred for a further 30 minutes, washed with water (2× 200 ml.), aqueous sodium bicarbonate (3.75 g. in 150 ml. water), and again with water (150 ml.), the aqueous washes being re-extracted sequentially with 1,2-dichloroethane (50 ml.). The bulked organic phases were evaporated under reduced pressure to a gum which was crystallised from 2-propanol (260 ml.). The slurry so obtained was chilled to −5°, the crystals filtered and washed with chilled (−5°) 2-propanol (50 ml.), and finally dried in vacuo at 40° to give 50.9 g. (98.55%) of diphenylmethyl 2,2 - dimethyl - 6β - phenylacetamidopenam - 3α - carboxylate 1β - oxide, m.p. 127°; $[\alpha]_D$ +190°. The I.R. and N.M.R. spectra of the product agreed with those of an authentic sample.

EXAMPLE 19

2,2 - Dimethyl - 6β - phenylacetamidopenam - 3α - carboxylic acid 1β - oxide (100 mmol), benzophenone hydrazone (27 g.; 138 mmol) and iodine (5.0 mol. of a 1% w./v. solution in chloroform; 0.197 mmol) in 1,2-dichloroethane (90 ml.) were stirred and cooled to −5°. Peracetic acid (25 ml. of a 38% w./w. solution in acetic acid, 142 mmol) was added slowly during 45 minutes keeping the temperature between −5° and −7°, followed by a line wash of 1,2 - dichloroethane (10 ml.). The reaction mixture was stirred for a further 30 minutes, washed with water (2× 200 ml.), aqueous sodium bicarbonate (3.75 g. in 150 ml. water), and again with water (150 ml.), the aqueous washes being re-extracted sequentially with 1,2-dichloroethane (50 ml.). The bulked organic phases were evaporated under pressure to a gum which was crystallised from 2-propanol (260 ml.). The slurry so obtained was chilled to −5°, the crystals filtered and washed with chilled (−5°) 2-propanol (50 ml.), and finally dried in vacuo at 40° to give 50.7 g. (98.15%) of diphenylmethyl 2,2 - dimethyl - 6β - phenylacetamidopenam - 3α - carboxylate 1β-oxide, m.p. 146°; $[\alpha]_D$ +192°; benzophenonazine <0.2%. Solution spectra identified the ester with previous products.

EXAMPLE 20

Peracetic acid (22 ml. of a 38% w./w. solution in aqueous acetic acid; 0.11 mol) was added over 15 minutes to a suspension of N-ethylpiperidinium 2,2-dimethyl - 6β-phenylacetamidopenam - 3α - carboxylate. (44.9 g.; 0.10 mol) in water (100 ml.) at 0° to +5°. Chloroform (100 ml.) was added and the mixture acidified by adding concentrated hydrochloric acid (26 ml., 0.15 mol) over 20 minutes at 0°. The chloroform layer was collected and combined with a further chloroform extract (40 ml.) of the aqueous layer. The combined solution was washed with water (50 ml.) and cooled to −5°. Benzophenone hydrazone (26 g., 0.13 mol) and iodine (4.8 ml. of 1% w./v. solution in chloroform; 0.188 mmol) were added to the cold solution, then peracetic acid (27 ml. of the solution described above; 0.14 mol) was added over 15 minutes at −3° to −1°. The solution was stirred for 30 minutes at 0°, then worked-up in the usual way, giving diphenylmethyl 2,2 - dimethyl - 6β - phenylacetamidopenam - 3α-carboxylate 1β-oxide (46.1 g., 89.3%), m.p. 128°, $[\alpha]_D^{20}$ +189° (c 1.00 CHCl₃).

EXAMPLE 21

2,2 - Dimethyl - 6β - phenylacetamidopenam - 3α - carboxylic acid 1β - oxide (10 mmol) and peracetic acid (2.59 ml. of a 38.9% w./w. solution in acetic acid; 15 mmol) in tetrahydrofuran (80 ml.) were treated by addition of benzophenone hydrazone (3 g.; 15 mmol) in tetrahydrofuran (20 ml.) during 40 minutes with stirring. After the addition was complete the mixture was stirred for a further 45 minutes and stored overnight. The solvent was evaporated under reduced pressure, the residue dissolved in ethyl acetate (100 ml.), the ethyl acetate solution washed with aqueous sodium bicarbonate (35 ml. and 30 ml. of a 2.5% w./v. solution) and with water (30 ml.), dried over anhydrous magnesium sulphate, and evaporated under reduced pressure to an oil. The oil was crystallised from n-butanol (5 ml.), filtered, washed with n-butanol and diethyl ether, and dried in vacuo (38°) to yield 2.52 g. (48.7%) diphenylmethyl 2,2 - dimethyl - 6β - phenylacetamidopenam-3α-carboxylate 1β-oxide, m.p. 123–5°.

EXAMPLE 22

2,2-Dimethyl - 6β - phenylacetamidopenam-3α-carboxylic acid 1β-oxide (0.10 mol), 2-methylbenzophenone hydrazone, (0.13 mol), and iodine (4.8 ml. of a 1% w./v. solution in chloroform) in chloroform (155 ml.) were stirred and cooled to 0°. Peracetic acid (25 ml. of a 38% w./w. solution in aq. acetic acid; 0.142 mol) was added over 30 minutes, the temperature being kept at 0°. The mixture was stirred for a further 30 minutes at 0°, washed with water (2× 400 ml.), water (300 ml.) containing sodium bicarbonate (7.5 g.) and sodium chloride (2.5 g.), and water (300 ml.) containing sodium chloride (2.5 g.), the aqueous washes being re-extracted sequentially with chloroform (50 ml.). The combined chloroform solutions were distilled to a sticky syrup which was crystallised from propan-2-ol (260 ml.) giving 2'-methyl-diphenylmethyl 2,2 - dimethyl - 6β - phenylacetamidopenam - 3α - carboxylate 1β-oxide (51.6 g., 97.4%), m.p. 147.5 to 148.5°, $\nu_{max.}$ (CHBr₃) 3380 (NH), 1800 (β-lactam), 1748 (CO₂R), (1680, 1505 (CONH), 1038 cm.$^{-1}$ (S=O), τ (DMSO-d₆), 50:50 mixture of isomers, 2.03 (doublet J 9 Hz.; CONH), 2.3–2.8 (aromatic protons), 2.86, 2.90 (singlets; CO₂CH), 4.13 (double doublet, J 5, 9 Hz.; C–6 H), 4.56 (doublet, J 5 Hz.; C–5 H) 5.33 (singlet; C–3 H), 6.37 (singlet; CH₂CO), 7.65, 7.73 (singlets; Ar-CH₃), 8.39, 8.42 and 9.02 (singlets; C–2 Me₂). (Found: C, 68.1; H, 5.8; N, 5.2; S, 6.0.

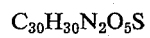

requires C, 67.9; H, 5.7; N, 5.3; S, 6.0%.)

EXAMPLE 23

2,2-Dimethyl - 6β - phenylacetamidopenam-3α-carboxylic acid 1β-oxide (100 mmole), 3-methylbenzophenone hydrazone (27.8 g.; 132 mmole), and iodine (4.8 ml. of a 1% w./v. solution in chloroform; 0.188 mmol) in 1,2-dichloroethane (90 ml.) were stirred and cooled to −5°. Peracetic acid (25 ml. of a 38% w./w. solution in acetic acid; 142 mmol) was added slowly during 26 minutes keeping the temperature between −7° and −4°, followed by a line wash of 1,2-dichloroethane (10 ml.). The reaction mixture was stirred for a further 30 minutes, washed with water (2× 200 ml.), aqueous sodium bicarbonate (5 g. in 200 ml. water), and again with water (150 ml.), the aqueous washes being re-extracted sequentially with 1,2-dichloroethane (50 ml.). The organic phases were bulked, evaporated under reduced pressure, and the residue dissolved in ethereal chloroform (15 ml. chloroform in 100 ml. diethyl ether). The solution so obtained was precipitated by addition to petroleum ether (5 vols.) at −10°, the precipitated solid filtered and dried in vacuo at 40° to give 51.5 g. (97%) of 3'-methyl-diphenylmethyl 2,2 - dimethyl - 6β - phenylacetamidopenam-3α-carboxylate 1β-oxide, m.p. 68–70°. I.R.: (Nujol) $\nu_{max.}$ 3360 and 3310 (NH), 1788 (β-lactam), 1744 (ester carbonyl), 1670 and 1500 (amide), 1028 (sulphoxide), 772, 755, 720, and 690 cm.$^{-1}$ (aromatic); (CHBr₃) $\nu_{max.}$ 3380 (NH), 1795 (β-lactam), 1748 (ester carbonyl), 1679 and 1502 (amide), 1032 (sulphoxide), 777, 755, and 720 cm.$^{-1}$ (aromatic). N.M.R. (CDCl₃) showed no evidence of diastereoisomers: τ 2.6 to 2.9 (m-tolyl protons), 2.66 (ester phenyl protons), 2.71 (side-chain phenyl protons), 2.89 (doublet, J 10 Hz.; amide proton), 3.04 (ester methine proton), 3.98 (double doublet, J 10, 4.5 Hz.; C6 proton), 5.07 (doublet, J 4.5 Hz.; C5 proton), 5.29 (C3 proton), 6.43 (side-chain benzylic protons), 7.68 (ester methyl protons), 8.36 and 9.12 (gem dimethyl protons).

EXAMPLE 24

2,2-Dimethyl - 6β - phenylacetamidopenam-3α-carboxylic acid 1β-oxide (100 mmol), 4-methylbenzophenone hydrazone (27.35 g.; 138 mmol), and iodine (4.8 ml. of a 1% w./v. solution in chloroform; 0.188 mmol) in 1,2-dichloroethane (90 ml.) were stirred and cooled to −5°. Peracetic acid (25 ml. of a 38% w./w. solution in acetic acid; 142 mmol) was added slowly during 60 minutes keeping the temperature between −5½° and −3½°, followed by a line wash of 1,2-dichloroethane (10 ml.). The reaction mixture was stirred for a further 30 minutes, washed with water (2× 200 ml.), aqueous sodium bicarbonate (3.75 g. in 150 ml. water), and again with water (150 ml.), the aqueous washes being re-extracted sequentially with 1,2-dichloroethane (50 ml.). The organic phases were bulked, evaporated under reduced pressure and the residue dissolved in a mixture of tetrahydrofuran (75 ml. and diethyl ether (75 ml.). The solution so produced was precipitated by addition to petroleum ether (1260 ml.) at −15°, the precipitated solid filtered and dried in vacuo at 40°, to give 56.9 g. of crude 4′-methyl-diphenylmethyl 2,2-dimethyl - 6β - phenylacetamidopenam-3α-carboxylate 1β-oxide.

The crude ester was twice purified by the addition of an ethereal solution into petroleum ether and the product so isolated had, m.p. 86°; $[\alpha]_D$ +177°. I.R.: (Nujol) $\nu_{max.}$ 3365 and 3315 (NH), 1790 (β-lactam), 1747 (ester carbonyl), 1675 and 1502 (amide, 1030 cm.$^{-1}$ (sulphoxide); N.M.R. (DMSO-$d_6$); τ 2.07 (doublet, J 9 Hz.; NH), 2.4 to 2.9 (benzhydryl aromatic protons), 2.7 (phenyl protons), 3.04 (benzhydryl α-proton), 4.12 (double doublet, J 9 Hz, 5 Hz.; C6 proton), 4.55 (doublet, J 5 Hz., C5 proton), 5.35 (C3 proton), 6.37 (side chain methylene protons), 7.71 (4′ methyl), 8.41 and 9.03 (gem dimethyl protons).

EXAMPLE 25

2,2-Dimethyl - 6β - phenylacetamidopenam - 3α-carboxylic acid 1β - oxide (100 mmol), 4-chlorobenzophenone hydrazone (30 g.; 138 mmole), and iodine (4.8 ml. of a 1% w./v. solution in chloroform; 0.188 mmol) in 1,2-dichloroethane (90 ml.) were stirred and cooled to −5°. Peracetic acid (25 ml. of a 38% w./w. solution in acetic acid; 142 mmol) was added slowly during 75 minutes keeping the temperature between −3° and −7°, followed by a line wash of 1,2-dichloroethane (10 ml.). The reaction mixture was stirred for a further 30 minutes, washed with water (2× 200 ml.), aqueous sodium bicarbonate (3.75 g. in 150 ml. water), and finally again with water (150 ml.), the aqueous washes being re-extracted sequentially with 1.2-dichloroethane (50 ml.). The organic phases were bulked, evaporated under reduced pressure, and the residue disolved in a mixture of tetrahydrofuran (75 ml.) and diethyl ether (75 ml.). The solution so obtained was precipitated by addition to petroleum ether (1260 ml.) at −15°, the precipitated solid filtered and dried in vacuo at 40° to give 60.6 g. crude 4′ - chloro - diphenylmethyl 2,2 - dimethyl - 6β - phenylacetamidopenam - 3α - carboxylate 1β-oxide. The crude ester was twice purified by the addition of an ethereal solution into petroleum ether and the product so isolated had m.p. 97°; $[\alpha]_D$ +172°; I.R.: (Nujol) $\nu_{max.}$ 3360 (NH), 1790 (β-lactam), 1750 (ester carbonyl), 1679 and 1510 (amide), 1040 cm.$^{-1}$ (sulphoxide); N.M.R. (DMSO-$d_6$) τ 2.01 (doublet, J 9 Hz.; NH), 2.48 and 2.54 (benzhydryl aromatic protons), 2.69 (phenyl protons), 2.98 (benzhydryl a-proton), 4.13 (double doublet, J 9 Hz., 5 Hz., C6 proton), 4.51 (doublet, J 5 Hz.; C5 proton), 5.29 (C3 proton), 6.36 (side chain methylene protons), 8.39, 9.00 and 9.03 (gem dimethyl protons mixture of isomers).

EXAMPLE 26

2,2-dimethyl - 6β - phenylacetamidopenam - 3α - carboxylic acid 1β-oxide (100 mmole), phenyl thien - 2 - yl ketone hydrazone (26.3 g.; 130 mmole), and iodine (4.8 ml. of a 1% w./v. solution in chloroform; 0.188 mmol) were stirred together in 1,2-dichloroethane (90 ml.) at −10°. Peracetic acid (25 ml. of a 38% w./w. solution in acetic acid; 142 mmol.) was added slowly during 20 minutes keeping the temperature in the range −8 to −2°. The mixture was stirred for a further 30 minutes, washed with water (2× 200 ml.), aqueous sodium bicarbonate (5 g. in 200 ml. water), and again with water (150 ml.), the aqueous washes being sequentially re-extracted with 1,2-dichloroethane (50 ml.). The bulked organic liquors were dried (magnesium sulphate) and evaporated under reduced pressure to a gum. The latter was crystallised from 2-propanol (100 ml.), the crystals filtered and washed with 2-propanol (50 ml.) and ether (50 ml.), and finally dried in vacuo at 38° to give 32.6 g. (62.4% theory) of a-(thien - 2 - yl) - benzyl 2,2-dimethyl - 6β - phenylacetamidopenam - 3a - carboxylate 1β - oxide. Recrystallised from 2-propanol the ester had m.p. 125–6°. I.R.: (Nujol) $\nu_{max.}$ 3360 (NH), 1792 (β-lactam), 1742 (ester carbonyl), 1672 and 1508 cm.$^{-1}$ (amide); (CHBr$_3$) $\nu_{max.}$ 3385 (NH), 1799 (β-lactam), 1752 and 1203 (ester group), 1680 and 1508 (amide), and 1038 cm.$^{-1}$ (sulphoxide). N.M.R. (CDCl$_3$) revealed the presence of ester diastereoisomers: τ 2.5 to 3.1 (amide proton and thienyl protons), 2.61 (ester phenyl protons), 2.71 (side chain phenyl protons), 3.02 and 3.07 (ester methine proton), 3.98 (double doublet, J 10, 4.5 Hz.; C6 proton), 5.05 and 5.07 (doublets, J 4.5 Hz.; C5 proton), 5.31 (C3 proton), 6.42 (side-chain benzylic protons), 8.32 and 9.03, 8.37 and 9.09 (gem dimethyl protons).

EXAMPLE 27

2,2 - Dimethyl - 6β-phenylacetamidopenam - 3a - carboxylic acid 1β - oxide (100 mmol), peracetic acid (23 ml. of a 38% w./w. solution in acetic acid; 133 mmol), and iodine (5.17 ml. of a 1% w./v. solution in chloroform; 0.204 mmol) in chlorofrom (150 ml.) were stirred and cooled to +17°. Fluorenone hydrazone (21.4 g.; 110.2 mmol) was added slowly during 90 minutes keeping the temperature between +17° and +25°, the last of the crystals being rinsed in with chloroform (10 ml.). The reaction mixture was stirred for a further 30 minutes, washed with water (2× 200 ml.), agueous sodium bicarbonate (3.75 g. in 150 ml. water), and again with water (150 ml.), the aqueous washes being re-extracted sequentially with chloroform (50 ml.). The organic phases were bulked, evaporated under reduced pressure and the residue dissolved in a mixture of tetrahydrofuran (50 ml.) and diethyl ether (100 ml.). The solution so obtained was precipitated by addition to petroleum ether (1260 ml.) at −15°, the precipitated solid filtered and dried in vacuo at 40°, to give 38.3 g. (74.4%) of crude fluoren-9-yl 2,2 - dimethyl - 6β - phenylacetamidopenam-3a-carboxylate 1β-oxide.

The crude ester was twice purified by the addition of an ethereal solution into petroleum ether and the product so isolated had m.p. 140°, $[a]_D$ +138°.

I.R.: (Nujol) $\nu_{max.}$ 3300 (NH), 1792 (β-lactam), 1752 and 1736 (ester carbonyl), 1658 and 1510 (amide), 1035 cm.$^{-1}$ (sulphoxide); N.M.R. (DMSO-$d_6$) τ 1.9 to 2.7 (NH plus fluorenyl protons), 2.71 (phenyl protons), 3.09 (—CO$_2$—CH<), 4.14 (double doublet, J 9 and 4.5 Hz.; C6 proton), 4.50 (doublet, J 4.5 Hz.; C5 proton), 5.40 (C3 proton), 6.39 (side chain methylene protons), 8.48 and 8.72 (gem dimethyl protons).

EXAMPLE 28

2,2 - Dimethyl - 6β-phenylacetamidopenam-3α-carboxylic acid 1β-oxide (2.00 mol), peracetic acid (990 ml. of a 37.2% w./w. solution in acetic acid; 5.495 mol), and iodine (184 ml. of a 1% w./v. solution in 1,2-dichloroethane; 7.245 mmol) in 1,2-dichloroethane (1000 ml.) were stirred and cooled to −20°. Furfuraldehyde hydrazone (550 g.; 4.995 mol) in 1,2-dichloroethane (600 ml.) was added slowly during 90 minutes keeping the temperature between −23° and −16°, followed by a line wash of 1,2-dichloroethane (400 ml.). The reaction mixture was stirred for a further 30 minutes, washed with water (2× 400 ml.), aqueous sodium bicarbonate (75 g. in 3000 ml. water) and again with water (3000 ml.), the aqueous washes being re-extracted sequentially with 1,2-dichloroethane (2× 500 ml.). The organic phases were bulked, evaporated under reduced pressure and the residue crystallised from hot (50° C.) 2-propanol (2000 ml.). The slurry so obtained was chilled to −5°, the crystals filtered, washed with chilled (−5°) 2-propanol (1000 ml.) and dried in vacuo at 40° to give 783.75 g. (91.05%) of 2′-furylmethyl 2,2-dimethyl-6β-phenylacetamidopenam-3α-carboxylate 1β-oxide, m.p. 150°; [α]$_D$ +211°.

I.R.: (Nujol) $\nu_{max.}$ 3392 (NH), 1785 and 1780 (β-lactam), 1758 and 1738 (ester carbonyl), 1680 and 1512 (amide), 1012 cm.$^{-1}$ (sulphoxide); N.M.R. (DMSO-d$_6$): τ 2.08 (doublet, J 9 Hz. NH), 2.28 (double doublet, J 2 Hz., 1 Hz.; 5'H), 2.69 (phenyl protons), 3.38 (double doublet, J 3.5 Hz., 2 Hz.; 3'H), 3.51 (double doublet J 3.5 Hz., 2 Hz.; 4'H), 4.16 (double doublet, J 9 Hz., 5 Hz.; C6 proton), 4.54 (doublet, J 5 Hz.; C5 proton), 4.61 and 4.85 (AB quartet, J 13 Hz.; —CO$_2$—CH$_2$—), 5.52 (C3 proton), 6.39 (side chain methylene protons), 8.48 and 8.92 (gem dimethyl protons).

In like manner 2,2 - dimethyl - 6β - phenylacetamidopenam-3α-carboxylic acid 1β-oxide, peracetic aicd and iodine in chloroform were reacted with cyclohexanone hydrazone to give *cyclohexyl 2,2 - dimethyl-6β-phenylacetamidopenam-3α-carboxylate 1-oxide* m.p. 121° C., [α]$_D$ +182°. A sample recrystallised from ethanol had m.p. 135° C., [α]$_D$ +188°. I.R.: (Nujol) $\nu_{max.}$ 3400 and 3800 (NH), 1782 and 1772 (β-lactam), 1737 (ester carbonyl), 1680 and 1500 (amide); N.M.R. (DMSO-d$_6$): τ 2.04 (doublet J 5 Hz.; C5 proton), 5.12 (COOCH), 5.57 (C3 (double doublet, J 9 Hz., 5 Hz.; C6 proton), 4.52 (doublet J 5 Hz.; C5 proton), 5.$^{12}$ (COOCH), 5.57 (C3 proton), 6.38 (side chain methylene protons), 7.9 to 9.1 cyclohexyl methylene protons), 8.38 and 8.80 (gem dimethyl).

EXAMPLE 29

D - (—)-N-(2,2,2-trichloroethoxycarbonyl)-2-phenylglycine (16.33 g.; 50 mmol), chloroform (100 ml.), benzophenone hydrazone (13.0 g.; 65 mmol), and iodine (2.4 ml. of a 1% w./v. solution in chloroform; 9.4×10$^{-2}$ mmol) were stirred together and cooled to —2°. Peracetic acid (12.5 ml. of a 38% w./w. solution in acetic acid; 71 mmol) was added during 7 minutes keeping the temperature below 7°. After the addition was complete the mixture was stirred for 50 minutes without cooling (temperature rose to 19°), filtered, the filtered crystals washed with ether (80 ml.) and dried to give 18.8 g. diphenylmethyl D - (—) - N - (2,2,2-trichloroethoxycarbonyl)-2-phenylglycinate, m.p. 177–8°. The ester wash from the first crop of crystals was evaporated under reduced pressure, the residue was dissolved in chloroform (50 ml.) and added to the filtered reaction mixture. The combined chloroform liquors were washed with water (2× 100 ml.) aqueous sodium bicarbonate (5 g. in 200 ml. water), and again water (150 ml.), the aqueous washes being sequentially reextracted with chloroform (50 ml.). The chloroform liquors were bulked, dried (MgSO$_4$), evaporated under reduced pressure, the residue triturated with ether, the resulting crystalline solid filtered, washed copiously with ether, and dried to give a further 3.6 g. diphenylmethyl D - (—) - N-(2,2,2-trichloroethoxycarbonyl)-2-phenylglycinate, m.p. 175–7° (total yield 91% theory).

The ester was recrystallised from actone to give white needles, m.p. 178–9°, homogeneous under chromatography (silica TLC plates, developed with 2:1 benzene:ethyl acetate, sprayed with 1% potassium permanganate solution or viewed under U.V. light—245 nm.). N.M.R. (DMSO-d$_6$): τ 1.13 (doublet, J 8 Hz.; NH), 2.62 (benzhydryl aromatic protons), 2.80 (phenyl protons); 3.16 (benzhydryl-α-proton), 4.48 (doublet, J 8 Hz.; C2 proton), and 5.15 (trichloroethyl protons). I.R.: (Nujol) $\nu_{max.}$ 3392 (NH), 1742 (ester carbonyl), 1724 and 1530 cm.$^{-1}$ (amide); (CHBr$_3$) $\nu_{max.}$ 3425 (NH), 1735 (ester carbonyl), 1735 and 1500 cm.$^{-1}$ (amide). [α]$_D^{20}$ (c. 0.8, CHCl$_3$) —37°.

EXAMPLE 30

2,2 - Dimethyl-6β-phenoxyacetamidopenam-3α-carboxylic acid 1β-oxide (100 mmol), benzophenone hydrazone (27 g.; 138 mmol) and iodine (5.0 ml. of a 1% w./v. solution in chloroform; 0.197 mmol) in chloroform (90 ml.) containing acetone (5.8 ml.) were stirred and cooled to 0°. Peracetic acid (25 ml. of a 38% w./w. solution in acetic acid; 142 mmol) was added slowly during 45 minutes keeping the temperature between 0° and +5°, followed by a line wash of chloroform (10 ml.). The reaction mixture was stirred for a further 45 minutes, washed with water (2× 200 ml.), aqueous sodium bicarbonate (3.75 g. in 150 ml. water) and again with water (150 ml.), the aqueous washes being re-extracted sequentially with chloroform (50 ml.). The bulked organic phases were evaporated under reduced pressure to a gum which was crystallised from 2-propanol (260 ml.). The slurry so obtained was chilled to —5°, the crystals filtered and washed with chilled (—5°) 2-propanol (100 ml.), and finally dried *in vacuo* at 40° to give 50.5 g. (94.8%) of *diphenylmethyl 2,2 - dimethyl-6β-phenoxy-acetamidopenam-3α-carboxylate 1β-oxide*, m.p. 149°; [α]$_D$ +162° Recrystallised from diethyl ether (6 volumes) with chloroform (1 volume) the ester had m.p. 149–150°. I.R.: (Nujol) $\nu_{max.}$ 3360 (NH), 1782 (β-lactam), 1740 (ester carbonyl, 1678 and 1500 cm.$^{-1}$ amide); (CHBr$_3$) $\nu_{max.}$ 3360 (NH), 1797 (β-lactam), 1748 ester carbonyl), 1685 and 1520 cm.$^{-1}$ (amide); N.M.R. (DMSO-d$_6$): τ 1.72 (doublet, J 10 Hz.; NH) 2.4 to 2.8 (phenyl meta protons), 2.8 to 3.1 (phenyl ortho and para protons), 2.54 (benzhydryl aromatic protons), 3.00 (benzhydryl-α-proton), 3.93 (double doublet, J 10 Hz., 5 Hz.; C6 proton), 4.45 (doublet, J 5 Hz.; C5 proton), 5.23 (C3 proton), 5.32 (side chain methylene protons), 8.35 and 9.00 (gem dimethyl protons).

EXAMPLE 31

2,2 - Dimethyl - 6β-phenylacetamidopenam-3α-carboxylic acid 1β-oxide (100 mmol), and benzophenone hydrazone (27 g.; 138 mmol), in chlorofrom (400 ml.) were stirred and cooled to —5°. Periodic acid (28.4 g.; 148 mmol) was added slowly during 30 minutes keeping the temperature between —5° and —3°. The reaction mixture was stirred for 90 minutes, allowed to warm to room temperature, and washed with water (2× 20 ml.), aqueous sodium bicarbonate (3.75 g. in 150 ml. water), and again with water (150 ml.), the aqueous washes being re-extracted sequentially with chloroform (50 ml.). The bulked organic phases were evaporated under reduced pressure to a gum which was crystallised from 2-propanol (250 ml.). The slurry so produced was chilled to —5°, the crystals filtered, washed with chilled (—5°) 2-propanol (50 ml.) and finally dried *in vacuo* at 40° to give 36.0 g. (69.7%) of crude diphenylmethyl 2,2-dimethyl-6β - phenylacetamidopenam-3α-carboxylate 1β-oxide. Recrystallised from ethanol this had m.p. 127°; [α]$_D$=193°.

EXAMPLE 32

To D-(—)-phenylglycine (15.1 g.; 100 mmol) in ethanol (200 ml.) was added concentrated hydrochloric acid (8.62 ml.; 100 mmol), peracetic acid (26.5 ml. of a 36% w./w. solution in acetic acid; 142 mmol) and iodine (4.8 ml. of a 1% w./v. solution in 1,2-dichloroethane). The mixture was stirred and cooled to 0° and benzophenone hydrazone (27 g.; 138 mmol) was added slowly during 67 minutes keeping the temperature in the range 0 to 5°. The mixture was stirred for 82 minutes after the addition was complete, filtered, the filter washed with ethanol, the filtrate and washes combined, evaporated under reduced pressure (temperature not exceeding 36°), the residue dispersed in dilute hydrochloric acid (200 ml. 2N), the resulting solid filtered, washed with water and dried *in vacuo* to give 12.09 g. *diphenylmethyl D-(—)-phenylglycinate hydrochloride*. By evaporation under reduced pressure and neutralisation with ammonia to pH 7 the bulked aqueous filtrate and washes yielded 8.11 g. unchanged D-(—)-phenylglycine. Yield of ester hydrochloride was 73.9% on the basis of D-(—)-phenylglycine consumed. The *diphenylmethyl D-(—)-phenylglycinate*

*hydrochloride* had m.p. 190–191° (decomposition); N.M.R. (DMSO-d$_6$) τ ca. 0.7

2.2 to 3.0 (diphenylmethyl aromatic protons), 2.6 (phenyl), 3.08 (diphenylmethyl methine proton), and 4.53 (C2 proton); I.R. (Nujol) $\nu_{max}$; 2673 and 2598

(—NH$_3^+$), 1732 and 1219 (ester group), 1580 and 1551, 730 and 682 cm.$^{-1}$ (aromatic).

EXAMPLE 33

3-Acetoxymethyl-7β-(2 - thienylacetamido) ceph-3-em-4-carboxylic acid 1β-oxide (2.06 g.), benzophenone hydrazone (1.4 g.). chloroform (10 ml.) and 1% solution of iodine in dichloromethane (0.26 ml.) were stirred at 0°. A solution of 38% w./w. peracetic acid in acetic acid (1.35 ml.) dissolved in chloroform (10 ml.) was added dropwise over 40 minutes maintaining the temperature at about 0°. The mixture was filtered to remove unreacted starting material (0.9 g.) and the organic filtrate washed with saturated sodium bicarbonate solution (5× 50 ml.) and water (3× 50 ml.) and dried over magnesium sulphate. After filtration the chloroform was evaporated, the residue dissolved in a small amount of chloroform and this solution added dropwise to stirred ether to give 1.2 g. 73.7% corrected for recovered input of crude diphenylmethyl 3-acetoxymethyl-7β-(2-thienylacetamido) ceph-3-em-4-carboxylate 1β-oxide. I.R. (Nujol mull): $\nu_{max}$; 3290 (NH), 1790 (β-lactam), 1730 (ester carbonyls), 1660 and 1530 (amide), 1225 (ester); N.M.R. (DMSO-d$_6$): 2.3 to 3.2 (thienyl and diphenylmethyl protons), 3.9 to 4.2 (quadruplet, C–7 proton), 4.8 to 5.6 (5 peaks), 6.12 (side chain methylene), 6.28 and 6.70 (doublet, methylene at C–2), 8.05 (acetoxy methyl); T.D.C. (silica): 0.92 m.p. 188–190°.

The embodiments of the invention in which an exclusive property or privilege is claimed are defined as follows:

1. In a process for the preparation of an ester of an acid of the formula

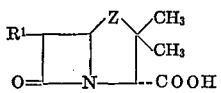

wherein Z is a divalent radical >S or >S→O (α- or β-) and R$^1$ is phenylacetamido or phenoxyacetamido, the step of contacting at a temperature of −50° to +120° C. said acid with a hydrazone of the formula

wherein each of R$^2$ and R$^3$ is a member selected from the group consisting of a hydrogen atom, a C$_1$–C$_6$ alkyl, C$_5$–C$_7$ cycloalkyl phenyl, naphthyl, benzyl, thienyl and furyl group and such a group substituted by at least one of chloro, bromo, cyano, nitro, C$_1$–C$_6$ alkyl and C$_1$–C$_6$ alkoxy, at least one of R$^2$ and R$^3$ being other than a hydrogen atom, or R$^2$ and R$^3$ together with the adjacent carbon atom form a C$_5$–C$_7$ cycloalkyl group or a fluoren-9-yl group, in the presence of an oxidizing agent to yield a compound containing the ester group

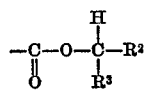

wherein R$^2$ and R$^3$ have the above defined meanings, there being used from 1–3 moles of oxidising agent and from 1–3 moles of hydrazone per mole of said acid.

2. A process as defined in claim 1 wherein R$^2$ and R$^3$ are each phenyl.

3. A process as defined in claim 1 wherein the oxidising agent is peracetic acid or m-chlorobenzoic acid.

4. A process as defined in claim 3 wherein the oxidising agent is peracetic acid.

5. A process as defined in claim 1 wherein the reaction is performed in the presence of iodine as catalyst.

6. A process as defined in claim 5 carried out in the presence of 10$^{-1}$–10$^{-3}$ moles of iodine per mole of said acid.

7. A process as defined in claim 1 wherein Z is >S→O.

8. A process as defined in claim 1 carried out in methylene dichloride, chloroform, 1,1-dichloroethane or 1,2-dichloroethane as solvent.

9. A process as defined in claim 1 wherein less than about a molar proportion of the acid is contacted with the hydrazone of formula (I).

10. A process for the preparation of an ester of a 2,2-dimethyl penam-3α-carboxylic acid 1β-oxide having phenylacetamido or phenoxyacetamido at position 6 which comprises contacting said acid at a temperature of −50° to +120° C. with a hydrazone of the formula

wherein each of R$^2$ and R$^3$ is a member selected from the group consisting of a hydrogen atom, a C$_1$–C$_6$ alkyl, C$_5$–C$_7$ cycloalkyl, phenyl, naphthyl, benzyl, thienyl and furyl group and such a group substituted by at least one of chloro, bromo, cyano, nitro, C$_1$–C$_6$ alkyl and C$_1$–C$_6$ alkoxy, at least one of R$^2$ and R$^3$ being other than a hydrogen atom, or R$^2$ and R$^3$ together with the adjacent carbon atom form a C$_5$–C$_7$ cycloalkyl group or a fluoren-9-yl group in the presence of peracetic acid or m-chlorobenzoic acid as oxidising agent to yield the corresponding penicillin having the group —C(O)O.CHR$^2$(R$^3$) at the 3α-position, there being used from 1–3 moles of oxidising agent and from 1–3 moles of hydrazone per mole of said acid.

11. A process as defined in claim 10 wherein the hydrazone is benzophenone hydrazone.

12. A process as defined in claim 10 wherein less than about a molar proportion of said acid is contacted with the hydrazone of formula (I).

13. A process as defined in claim 12 wherein said ester is diphenylmethyl 2,2-dimethyl - 6β - phenylacetamidopenam-3α-carboxylate 1β-oxide, said hydrazone is benzophenone hydrazone and said oxidising agent is peracetic acid.

References Cited
UNITED STATES PATENTS 3,632,850   1/1972   Garbecht _____ 260—243 C NICHOLAS S. RIZZO, Primary Examiner U.S. Cl. X.R.

260—243 C; 424—246, 271